United States Patent
Xu et al.

(10) Patent No.: US 9,940,017 B2
(45) Date of Patent: Apr. 10, 2018

(54) CHARACTER INPUTTING METHOD AND DEVICE AND INTELLIGENT TERMINAL

(71) Applicants: HISENSE ELECTRIC CO., LTD., Qingdao, Shandong (CN); HISENSE USA CORPORATION, Suwanee, GA (US); HISENSE INTERNATIONAL CO., LTD., Qingdao, Shandong (CN)

(72) Inventors: Aichen Xu, Shandong (CN); Caixia Zhao, Shandong (CN); Shubin Zhao, Shandong (CN)

(73) Assignees: HISENSE ELECTRIC CO., LTD., Qingdao, Shandong (CN); HISENSE USA CORPORATION, Suwanee, GA (US); HISENSE INTERNATIONAL CO., LTD., Qingdao, Shandong (CN)

( * ) Notice: Subject to any disclaimer, the term of this patent is extended or adjusted under 35 U.S.C. 154(b) by 248 days.

(21) Appl. No.: 14/712,594

(22) Filed: May 14, 2015

(65) Prior Publication Data

US 2016/0162181 A1 Jun. 9, 2016

(30) Foreign Application Priority Data

Dec. 8, 2014 (CN) .......................... 2014 1 0747073

(51) Int. Cl.
*G06F 3/00* (2006.01)
*G06F 3/0488* (2013.01)
(Continued)

(52) U.S. Cl.
CPC .......... *G06F 3/04886* (2013.01); *G06F 3/018* (2013.01); *G06F 3/0236* (2013.01); *G06F 3/0237* (2013.01)

(58) Field of Classification Search
CPC ... G06F 3/0234; G06F 3/04886; G06F 3/0237
See application file for complete search history.

(56) References Cited

U.S. PATENT DOCUMENTS

| 8,484,573 B1* | 7/2013 | Zhai | G06F 3/04886 |
| | | | 345/168 |
| 2011/0099506 A1* | 4/2011 | Gargi | G06F 3/0234 |
| | | | 715/773 |

(Continued)

FOREIGN PATENT DOCUMENTS

CN 103823572 5/2014

*Primary Examiner* — Haoshian Shih
(74) *Attorney, Agent, or Firm* — Boyle Fredrickson, S.C.

(57) ABSTRACT

Disclosed is a character inputting method, device and an intelligent terminal, the method including: when a virtual key in a virtual on-screen keyboard layout is selected, invoking a first probability statistical table matching at least one character having been displayed by at least one virtual key having been selected; displaying a part of the candidate characters with the highest combination probabilities or all of the candidate characters in the invoked first probability statistical table respectively on virtual keys in the virtual on-screen keyboard layout, and resetting focus on a preset virtual key, wherein any candidate character displayed on a virtual key configured with higher level has higher combination probability; and performing operations above periodically until an ideogram or a character sequence to be input is selected, and inputting the selected ideogram or the character sequence selected in an input area.

15 Claims, 10 Drawing Sheets

(51) Int. Cl.
*G06F 3/023* (2006.01)
*G06F 3/01* (2006.01)

(56) References Cited

U.S. PATENT DOCUMENTS

2015/0135123 A1* 5/2015 Carr ..................... G06F 3/0237
 715/773
2017/0052702 A1* 2/2017 Norris, III .......... G06F 3/04886

* cited by examiner

US 9,940,017 B2

CHARACTER INPUTTING METHOD AND DEVICE AND INTELLIGENT TERMINAL

CROSS-REFERENCE TO RELATED APPLICATIONS

This application claims the benefit and priority of Chinese Patent Application No. 201410747073.7 filed with the State Intellectual Property Office of People's Republic of China on Dec. 8, 2014, the content of which is incorporated herein by reference in its entirety.

BACKGROUND

The present disclosure relates to the field of display technologies and particularly to a character inputting method and device and an intelligent terminal.

When a character is to be input on an application interface of an intelligent terminal widely applied at present, a virtual key arranged in a virtual on-screen keyboard layout of the intelligent terminal needs to be selected by using an input control device, but typically the keys arranged on the input control device are not in a one-to-one correspondence with virtual keys in the virtual on-screen keyboard layout due to a limited number of keys, so a user inputting the character needs to select the desired virtual key by moving the focus by means of navigation keys (Up, Down, Left and Right keys) on the input control device.

SUMMARY

Some embodiments of the disclosure provide a character inputting method including:

when a virtual key in a virtual on-screen keyboard layout is selected by a user, invoking a first probability statistical table matching at least one character having been displayed by at least one virtual key having been selected, wherein the first probability statistical table records combination probabilities of candidate characters respectively being combined with the at least one character;

displaying a part of the candidate characters with the highest combination probabilities or all of the candidate characters in the invoked first probability statistical table respectively on virtual keys in the virtual on-screen keyboard layout, and resetting focus on a preset virtual key, wherein in the virtual on-screen keyboard layout, the preset virtual key is configured with the highest level, any of other virtual keys spaced a greater number of steps apart from the preset virtual key is configured with a lower level, the number of steps is the least number of virtual keys along a path from the preset virtual key to the any of other virtual keys, and any of the candidate characters displayed on one of the virtual keys configured with a higher level has higher combination probability; and performing operations above periodically until an ideogram or a character sequence to be input is selected by the user, and inputting the ideogram or the character sequence selected by the user in an input area.

Some embodiments of the disclosure further provide a character inputting device including a memory and one or more processors, wherein the memory stores one or more computer readable program codes, and the one or more processors are configured to execute the one or more computer readable program codes:

when a virtual key in a virtual on-screen keyboard layout is selected by a user, to invoke a first probability statistical table matching at least one character having been displayed by at least one virtual key having been selected, wherein the first probability statistical table records combination probabilities of candidate characters respectively being combined with the at least one character;

to display a part of the candidate characters with the highest combination probabilities or all of the candidate characters in the invoked first probability statistical table respectively on virtual keys in the virtual on-screen keyboard layout, and to reset focus on a preset virtual key, wherein in the virtual on-screen keyboard layout, the preset virtual key is configured with the highest level, any of other virtual keys spaced a greater number of steps apart from the preset virtual key is configured with a lower level, the number of steps is the least number of virtual keys along a path from the preset virtual key to the any of other virtual keys, and any of the candidate characters displayed on one of the virtual keys configured with a higher level has higher combination probability; and when an ideogram or a character sequence to be input is selected by the user, to input the ideogram or the character sequence selected by the user in an input area.

Some embodiments of the disclosure further provide an intelligent terminal including a character inputting device including a memory and one or more processors, wherein the memory stores one or more computer readable program codes, and the one or more processors are configured to execute the one or more computer readable program code:

when a virtual key in a virtual on-screen keyboard layout is selected by a user, to invoke a first probability statistical table matching at least one character having been displayed by at least one virtual key having been selected, wherein the first probability statistical table records first probability statistical table records combination probabilities of candidate characters respectively being combined with the at least one character;

to display a part of the candidate characters with the highest combination probabilities or all of the candidate characters in the invoked first probability statistical table respectively on virtual keys in the virtual on-screen keyboard layout, and to reset focus on a preset virtual key, wherein in the virtual on-screen keyboard layout, the preset virtual key is configured with the highest level, any of other virtual keys spaced a greater number of steps apart from the preset virtual key is configured with a lower level, the number of steps is the least number of virtual keys along a path from the preset virtual key to the any of other virtual keys, and any of the candidate characters displayed on one of the virtual keys configured with a higher level has higher combination probability; and when an ideogram or a character sequence to be input is selected by the user, to input the ideogram or the character sequence selected by the user in an input area.

BRIEF DESCRIPTION OF THE DRAWINGS

In order to make the technical solutions according to the embodiments of the disclosure more apparent, the drawings to which reference is made in the description of the embodiments will be described below briefly, and apparently the drawings in the description below are merely illustrative of some of the embodiments of the disclosure, and those ordinarily skilled in the art can further derive from these drawings other drawings without any inventive effort. In the drawings.

DETAILED DESCRIPTION

Figure 1:
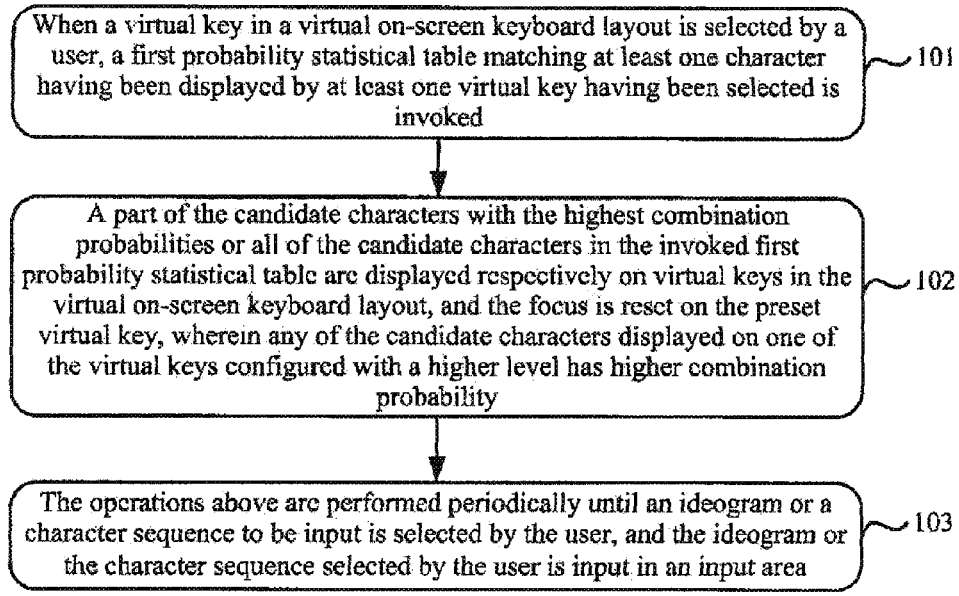
FIG. 1 illustrates a flow chart of operations of a character inputting method according to some embodiments of the disclosure.

In order to make the objects, technical solutions and advantages of the disclosure more apparent, the disclosure will be further described below with reference to the drawings, and apparently the embodiments described below are only a part but not all of the embodiments of the disclosure. All the other embodiments which can occur to those ordinarily skilled in the art based upon the embodiments here of the disclosure without any inventive effort will fall into the scope of the disclosure.

When a character is to be input by using the existing virtual on-screen keyboard of the intelligent terminal, the focus needs to be moved frequently through the navigation keys of the input control device, so in order to improve this troublesome and time-consuming operation, and the efficiency of inputting characters of an inputting device, there is provided a new character inputting device according to some embodiments of the disclosure, where a virtual on-screen keyboard layout of the character inputting device is different from the existing virtual on-screen keyboard layout, and candidate characters displayed on respective virtual keys in the virtual on-screen keyboard layout may not be fixed but may, under some rule, vary with at least one character having been displayed by at least one virtual keys selected by a user. It shall be noted that the character inputting device to which the embodiments of the disclosure relate may be configured in an intelligent TV set including but not limited to an intelligent TV set with an Android system or an intelligent TV set with another system; and moreover it can also be applicable to other intelligent terminals without involving touch screen-based selection operations.

According to some embodiments of the disclosure, there is provided a character inputting device with a virtual on-screen keyboard layout, where the virtual on-screen keyboard layout may include a plurality of virtual keys of the same and/or different sizes, and in the virtual on-screen keyboard layout, a highest level may be configured for a preset one of the virtual keys, and any of other virtual keys spaced a greater number of steps apart from the preset virtual key may be configured with a lower level; and when a virtual key in the virtual on-screen keyboard layout is selected by a user, a first probability statistical table matching at least one character having been displayed by at least one virtual key having been selected is invoked, a part of candidate characters with the highest combination probabilities or all of the candidate characters in the invoked first probability statistical table may be respectively displayed on virtual keys in the virtual on-screen keyboard layout by making any of the candidate characters displayed on one of the virtual keys configured with a higher level have higher combination probability, and the focus may be reset on the preset virtual key, so that any candidate character displayed on one of the virtual keys closer to the preset virtual key has a higher combination probability where the focus is set, to thereby avoid moving operations troublesome to the user and facilitate the selection of the virtual keys for the characters desired by the user. Moreover after the at least one virtual key is selected by the user, candidate ideograms or character sequences may be displayed on the virtual keys in the current virtual on-screen keyboard layout by also making any of candidate ideograms or candidate character sequences displayed on one of the virtual keys configured with a higher level have higher association probability so that any ideogram or character sequence displayed on one of the virtual keys closer to the focus has a higher association probability, and in this way, the ideogram or character sequence desired by the user can be reached along a path with a less number of steps to thereby improve the efficiency of inputting the ideogram or character sequence, and also an experience of the user, to some extent. In those embodiments, the candidate characters refer to any letter or digit, and may include the at least one character having been displayed by at least one virtual key having been selected. The character sequence refers to a sequence of characters, e.g., a word.

The solution according to some embodiments of the disclosure will be described below in connection with some embodiments of the disclosure, although the disclosure includes but will not be limited to the following embodiments.

As illustrated in FIG. 1, there is illustrated a flow chart of operations in a character inputting method according to some embodiments of the disclosure, where the character inputting method may be applicable to an intelligent terminal including a screen, e.g., a intelligent TV set, a flat panel TV set, a tablet PC, a smart phone, etc.; and a virtual on-screen keyboard layout may be arranged on the screen of the intelligent terminal, the virtual on-screen keyboard layout may include a plurality of virtual keys, the focus may be set on a preset virtual key configured with the highest level, any of other virtual keys spaced a greater number of steps apart from the preset virtual key may be configured with a lower level, and the number of steps is the least number of virtual keys along a path from the preset virtual key to the any of other virtual keys.

The method may include the following operations:

In the operation 101, when a virtual key in a virtual on-screen keyboard layout is selected by a user, a first probability statistical table matching at least one character having been displayed by at least one virtual key having been selected may be invoked.

In some embodiments of the disclosure, the user may select the virtual key through an input control device, that is, the user may transmit a corresponding operation instruction to the intelligent terminal through the input control device, for example, the user may move the focus through Up, Down, Left and Right movement keys and selects the virtual key displaying a desired character through a confirmation key.

Before the operation 101, other operations may be performed first: for example, the virtual on-screen keyboard layout may be initialized, and characters may be displayed based on a default first probability statistical table.

A part or all of the candidate characters in the default first probability statistical table may be displayed on the virtual keys in the initialized virtual on-screen keyboard layout.

Figure 2A:
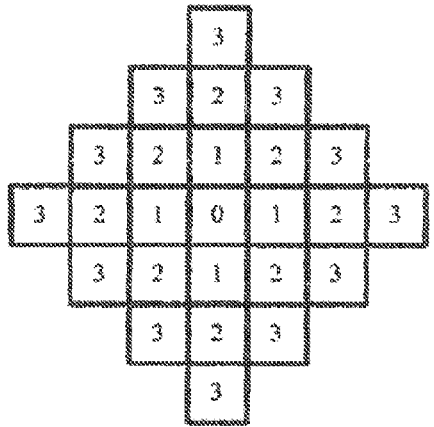
FIG. 2A, FIG. 2B and FIG. 2C illustrate schematic diagram of three virtual on-screen keyboard layout according to some embodiments of the disclosure respectively.
Figure 2B:
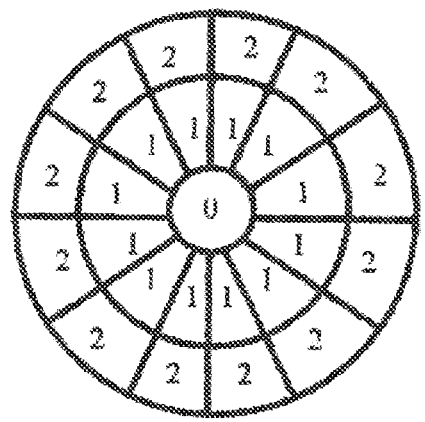
Figure 2C:
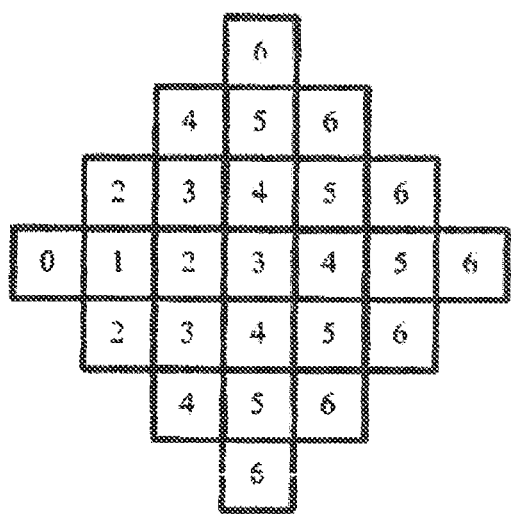

FIG. 2A, FIG. 2B and FIG. 2C illustrate schematic diagrams of three virtual on-screen keyboard layouts respectively.

The virtual on-screen keyboard layout may include a preset number of virtual keys. In the virtual on-screen keyboard layout, the focus may be set on the preset virtual key; and a plurality of virtual keys configured with a level 1 may be arranged one step apart from the preset virtual key, a plurality of virtual keys configured with a level 2 may be arranged two steps apart from the preset virtual key, and so on, and after the preset number of virtual keys are arranged as such, any of the virtual keys spaced a greater number of steps apart from the preset virtual key is configured with a lower level, where the preset virtual key may be positioned centrally in the virtual on-screen keyboard layout or at an edge of the virtual on-screen keyboard layout.

Firstly in FIG. 2A, the focus may be set centrally, and the virtual on-screen keyboard layout may be designed as a diamond, the virtual keys may be shaped as quadrangles, the respective virtual keys may be of the same size, the focus may be set on the central virtual key configured with the highest level, and any of other virtual keys spaced a greater number of steps apart from the preset virtual key may be configured with a lower level, where the number of steps is the least number of virtual keys along a path from the preset virtual key to the any of the other virtual keys.

Secondly in FIG. 2B, the focus may be set centrally, the virtual on-screen keyboard layout may be designed as circles including a plurality of concentric circles with different radiuses, the virtual on-screen keyboard layout may be divided radically into a plurality of different virtual keys, and the respective virtual keys may be of different sizes. The focus may be set on the central circular virtual key configured with the highest level, and any of other virtual keys spaced a greater number of steps apart from the preset virtual key may be configured with a lower level.

Thirdly the focus may be set at an edge of the virtual on-screen keyboard layout, and the virtual on-screen keyboard layout may be designed as a diamond or a circle. As illustrated in FIG. 2C, the focus may be set at the left edge of the virtual on-screen keyboard layout and a plurality of virtual keys may be arranged sequentially from the left to the right, and any of other virtual keys spaced a greater number of steps apart from the preset virtual key may be configured with a lower level.

It shall be noted that there are a number of possible virtual on-screen keyboard layout according to some embodiments of the disclosure, which are pre-stored in the intelligent terminal, and any of which is invoked selectively in response to a demand of the user to be operative to input characters.

Moreover the first probability statistical table may be generated as a result of learning by the character inputting device, or a probability statistical table in an existing character combination probability statistical library for inputting ideograms or character sequences may be applied directly, where the character combination probability statistical library may further record probability statistical tables preset for respective input attributes, for example, character combinations for ideograms or character sequences related to shopping may be set in some statistical library, character combinations for ideograms or character sequences related to football may be set in another statistical library, etc.

Moreover in some embodiments, only one ideogram or character sequence may be input in reality dependent upon the respective statistical library preset for the input attributes, and phrases, related to the ideogram or character sequence, including the ideogram or character sequence are displayed concurrently in a pull-down list, and then the user may make a selection through Up and Down keys, where the phrases displayed in the pull-down list are arranged sequentially in descending order of frequency of use (also a kind of combination probability), so that the user may select rapidly the desired phrase from the phrases displayed with relation to the first ideogram or character sequence without inputting the entire ideograms or character sequences to thereby improve the efficiency of inputting the phrase and also improve an experience of the user to some extent.

In some embodiments, after the virtual on-screen keyboard layout is initialized, and before the operation 101 is performed, the second probability statistical table matching at least one character having been displayed by at least one virtual key having been currently selected may be further invoked, where the second probability statistical table records association probabilities of candidate ideograms or candidate character sequences respectively being associated with the at least one character; and a part of the candidate ideograms or candidate character sequences with the highest association probabilities or all of the candidate ideograms or candidate character sequences in the second probability statistical table are displayed in other area than the current virtual on-screen keyboard layout.

The other area than the current virtual on-screen keyboard layout may be a strip-shaped display box or a popped-up box.

Since an area attribute of a input area may be fixed as, e.g., a shopping-related webpage search area, a video-related webpage search area, a reading-related webpage search area, etc., the following operations may be further performed before the operation 101:

Firstly the area attribute of the input area is detected, and a keyword for the area attribute is determined.

Then invoking the first probability statistical table matching at least one character having been displayed by at least one virtual key having been selected may be implemented particularly by picking out, from the set of first probability statistical tables stored in a preset storage area, at least one matching first probability statistical table according to the keyword for the area attribute; and invoking, from the picked-out at least one first probability statistical table, the first probability statistical table matching at least one character having been displayed by at least one virtual key having been selected by the user.

For the user inputting the character, the input attribute of the input area may be taken into account (e.g., an input attribute, of shopping, a webpage, reading, etc., associated with input contents) and the first probability statistical table or the second probability statistical table to be invoked may be associated with the input at least one character by determining the keyword for the input attribute to thereby improve the efficiency of inputting the character.

In the operation 102, a part of the candidate characters with the highest combination probabilities or all of the candidate characters in the invoked first probability statistical table are displayed respectively on virtual keys in the virtual on-screen keyboard layout by making any of the candidate characters displayed on one of the virtual keys configured with a higher level have higher combination probability, and the focus is reset on the preset virtual key.

TABLE 1

| | |
|---|---|
| P | 13.33 |
| Z | 11.67 |
| S | 8.33 |
| U | 8.33 |
| O | 7.50 |
| M | 6.67 |
| H | 5.83 |
| D | 5.00 |
| E | 5.00 |
| V | 4.17 |
| X | 4.17 |
| F | 3.33 |
| W | 3.33 |
| Q | 2.50 |
| T | 2.50 |
| A | 1.67 |
| B | 1.67 |
| G | 1.67 |
| Y | 1.67 |
| I | 0.83 |
| J | 0.83 |
| C | 0.00 |
| K | 0.00 |
| K | 0.00 |
| N | 0.00 |
| R | 0.00 |

Figure 3:
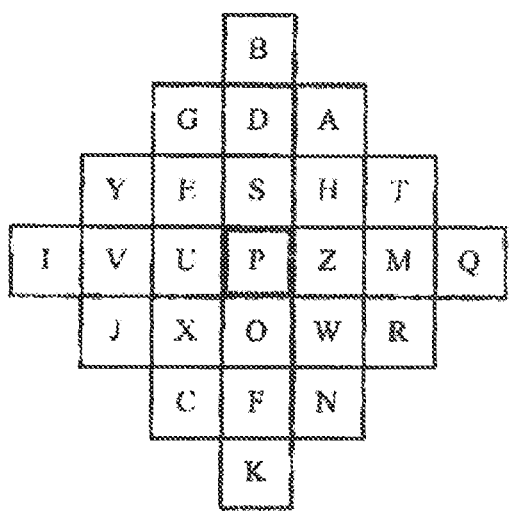
FIG. 3 illustrates a schematic diagram of a virtual on-screen keyboard layout with the candidate characters from a first probability statistical table depicted in Table 1 displayed thereon.

If the virtual on-screen keyboard layout illustrated in FIG. 2A is adopted, when the invoked first probability statistical table is Table 1 with candidate characters consisted of letters as shown above, then the virtual on-screen keyboard layout with candidate characters displayed thereon as illustrated in FIG. 3 will be formed, where P with the highest combination probability is displayed on the virtual key configured with the highest level, and Z, S, U and O with lower combination probabilities than P are displayed on the four virtual keys configured with the level 1, where correspondence relationship between the four virtual keys and the four candidate characters of Z, S, U and O will not be limited to any particular correspondence relationship but they may be displayed in any correspondence relationship. For example, Z may be displayed on any of the four virtual keys, and S may be displayed on any of the remaining three virtual keys, and U and O may also be displayed under the same rule. Alike, the remaining candidate characters are displayed respectively on the remaining virtual keys by making any of the remaining virtual keys configured with a higher level display one of the remaining candidate characters with higher combination probability.

In the operation 103, the operations above are performed periodically until an ideogram or a character sequence to be input is selected by the user, and the ideogram or the character sequence selected by the user is input in the input area.

After the at least one virtual key is selected by the user, if the ideogram or character sequence to be input by the user is absent among the candidate ideograms or character sequences displayed in the other area than the current virtual on-screen keyboard layout, then a part of the candidate ideograms or candidate character sequences with the highest association probabilities or all of the candidate ideograms or candidate character sequences in the invoked second probability statistical table may be respectively displayed on the virtual keys in the current virtual on-screen keyboard layout; and when one of the virtual keys in the virtual on-screen keyboard layout is selected by the user, the candidate ideogram or the character sequence displayed on the virtual key selected by the user may be input in the input area.

The character inputting method above will be described below in some examples thereof.

It shall be noted that the intelligent terminal is a widely applied electronic product applicable to a number of countries and languages, so the character as referred to in the disclosure may be a Chinese phonetic alphabet, an English character or a character in another language; and also may include a punctuation, a special character, etc. The character may be input in reality by the user performing a switch operation to select the type of character to be input, and moreover the Chinese character input method includes Quanpin (full phonetic spelling), Wu Bi (5-stroke) and other input methods, so the user may switch between the different input methods as needed and perform the character input operation according to the disclosure under the type of character and the input method.

A solution to inputting a Chinese character will be described below taking the Quanpin input method as an example.

Firstly the virtual on-screen keyboard layout is initialized, and characters are displayed based on the default first probability statistical table.

Figure 4A:
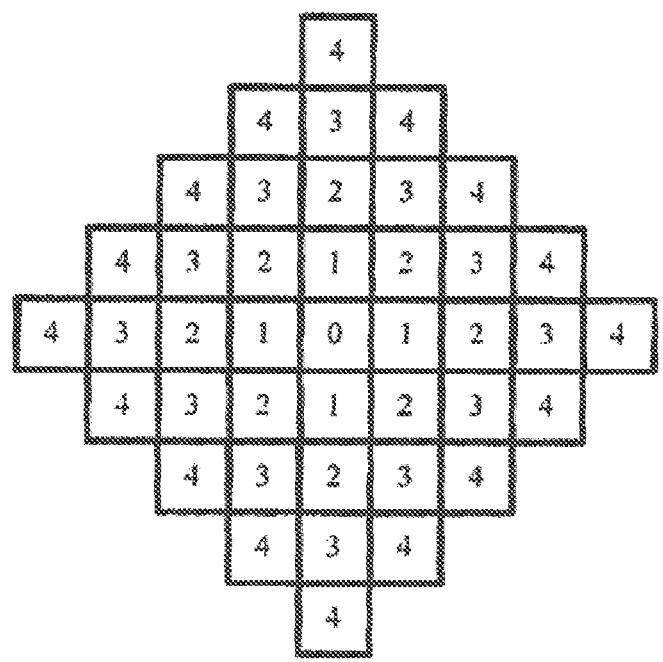
FIG. 4A illustrates a schematic diagram of a virtual on-screen keyboard layout selected by a user inputting a Chinese character according to some embodiments of the disclosure.

FIG. 4A illustrates the default virtual on-screen keyboard layout selected by the user, where the virtual key configured with the level 0 is positioned centrally, the virtual keys configured with the level 1 are positioned one step apart from the central virtual key, the virtual keys configured with the level 2 are positioned two steps apart from the central virtual key, the virtual keys configured with the level 3 are positioned three steps apart from the central virtual key, and so on.

Figure 5A:
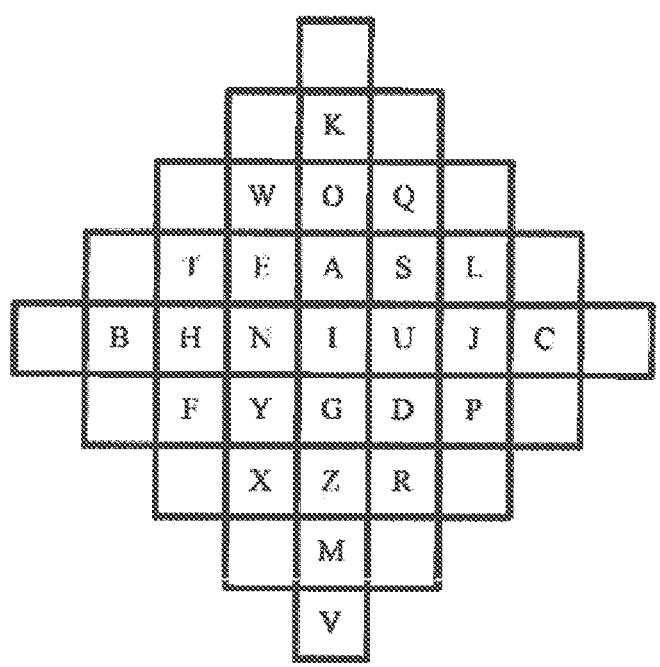
FIG. 5A illustrates a schematic diagram of a layout of candidate characters displayed on virtual keys in the virtual on-screen keyboard layout illustrated in FIG. 4A.

As illustrated in FIG. 5A, in the virtual on-screen keyboard layout of FIG. 4A, all the candidate characters in the default first probability statistical table are displayed on the virtual keys by making any of the candidate characters displayed on one of the virtual key configured with higher level have a higher combination probability, where in FIG. 5A, the candidate character I displayed in the central position where the focus is set has the highest combination probability indicating a higher probability of being used by the user, and any of the other candidate characters displayed on one of the virtual keys spaced a greater number of steps from the virtual key displaying I has a lower combination probability.

Figure 4B:
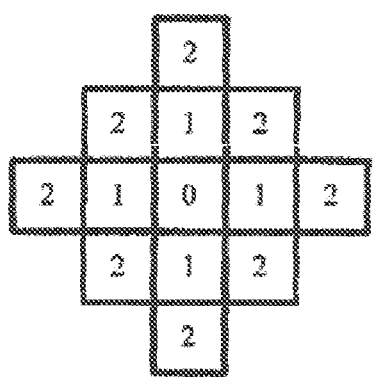
FIG. 4B illustrates a schematic diagram of another virtual on-screen keyboard layout selected by a user inputting a Chinese character according to some embodiments of the disclosure.
Figure 5B:
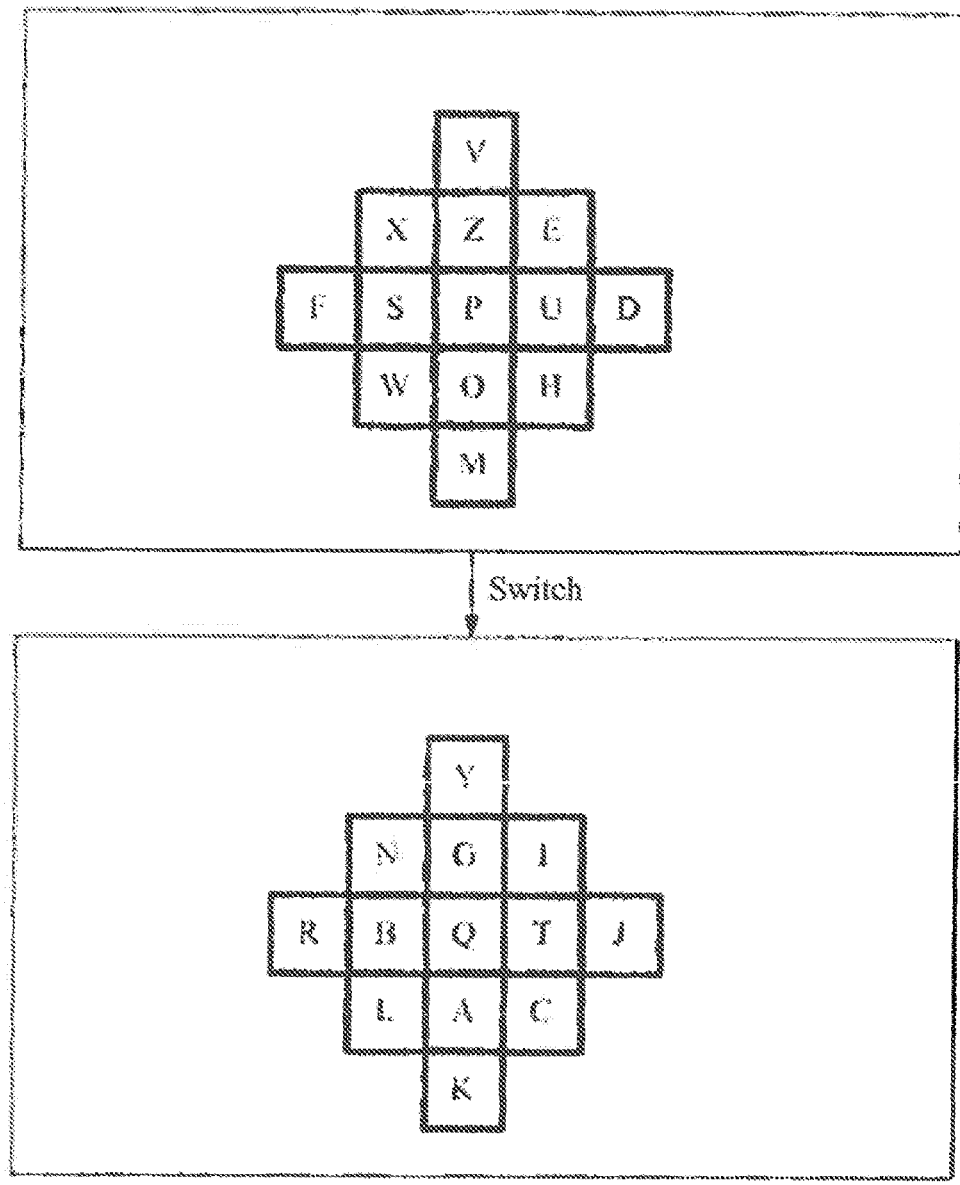
FIG. 5B illustrates a schematic diagram of a layout of candidate characters displayed on virtual keys in the virtual on-screen keyboard layout illustrated in FIG. 4B.

Moreover in view of a small screen of some intelligent terminals and a pleasing appearance of the virtual on-screen keyboard layout, the virtual on-screen keyboard layout as illustrated in FIG. 4A may be adjusted to the virtual on-screen keyboard layout including a less number of virtual keys as illustrated in FIG. 4B, and accordingly the entire candidate characters in the first probability statistical table can not be displayed at the same time on the virtual on-screen keyboard layout as illustrated in FIG. 4B. Taking the candidate characters given in Table 1, only the first thirteen candidate characters with the highest combination probabilities can be displayed firstly, and then can be replaced by the 14$^{th}$ to 26$^{th}$ candidate characters by using the page turning key. Alike all the candidate characters can be displayed through switching once, and reference may be made for details thereof to FIG. 5B illustrating a schematic diagram of the respective candidate characters in the first probability statistical table displayed on the virtual keys in the virtual on-screen keyboard layout illustrated in FIG. 4B.

Figure 6A:
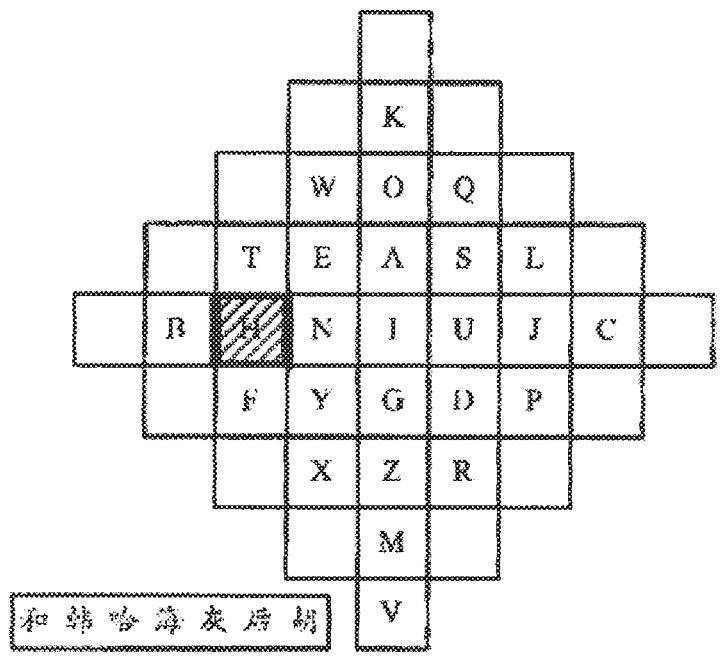
FIG. 6A to FIG. 6F illustrate schematic diagrams of the candidate characters, displayed on virtual keys in the virtual on-screen keyboard layout, varying with at least one characters corresponding to at least one virtual keys having been selected during the process for inputting the Chinese character "好"

If the Chinese character to be input is "好 (with the phonetic spelling as HAO)", then the user firstly needs to select the letter "H" which does not have the highest combination probability in the current default first probability statistical table and is displayed on the virtual key spaced two steps from the virtual key where the focus is set. The focus may be moved by using the input control device so that the focus reaches the virtual key where "H" is displayed, and "H" may be selected through the confirmation key in the input control device, so that the virtual key where "H" is displayed is displayed in grayscale (in the zone with inclined strips), for example. At this time, the second probability statistical table matching the selected "H" will be invoked and a part of candidate Chinese characters such as "和 (with the phonetic spelling as HE)", "韩 (with the phonetic spelling as HAN)", "哈 (with the phonetic spelling as HA)", "海 (with the phonetic spelling as HAI)", "灰 (with the phonetic spelling as HUI)", "后 (with the phonetic spelling as HOU)" and "胡 (with the phonetic spelling as HU)" with the highest association probabilities in the second probability statistical table may be displayed preferentially in the Chinese character display area other than the current virtual on-screen keyboard layout as illustrated in FIG. 6A. It shall be noted that due to a limited size of the display screen of the intelligent terminal, only a part of the candidate Chinese characters with the highest association probabilities in the second probability statistical table may be displayed for a pleasing appearance.

Figure 6B:
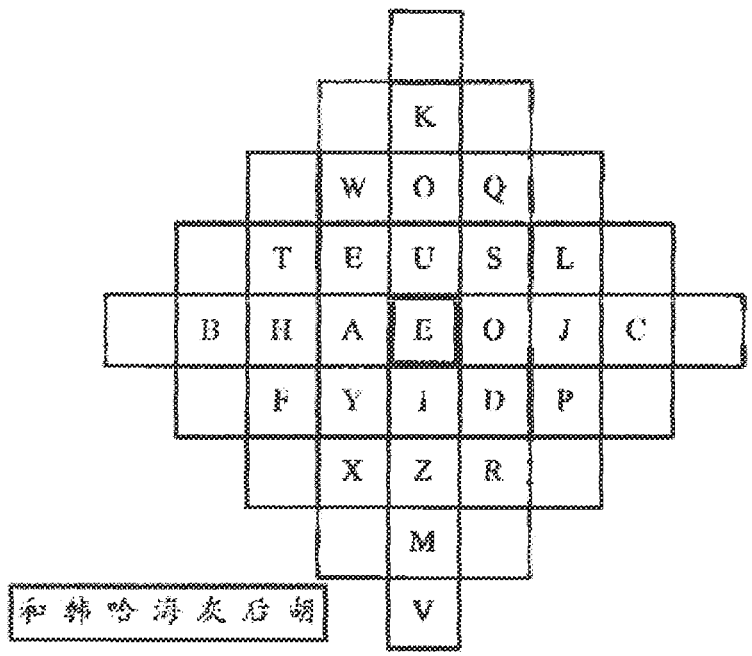
Figure 6C:
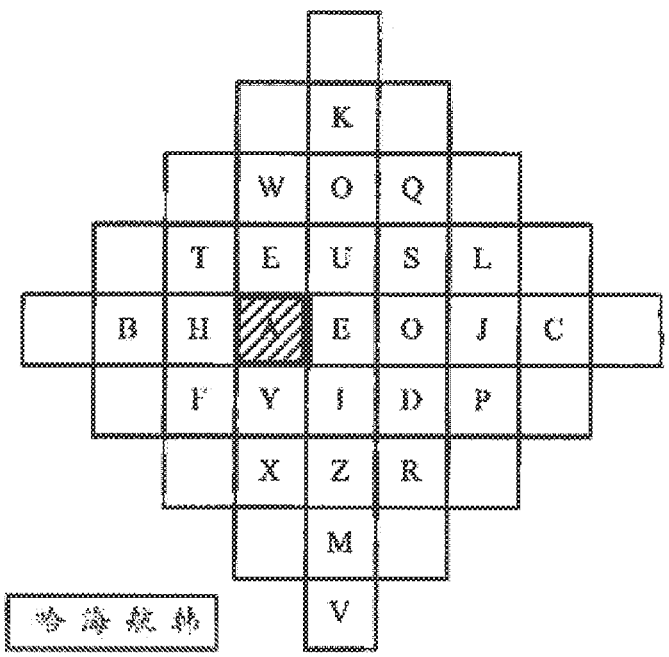
Figure 6D:
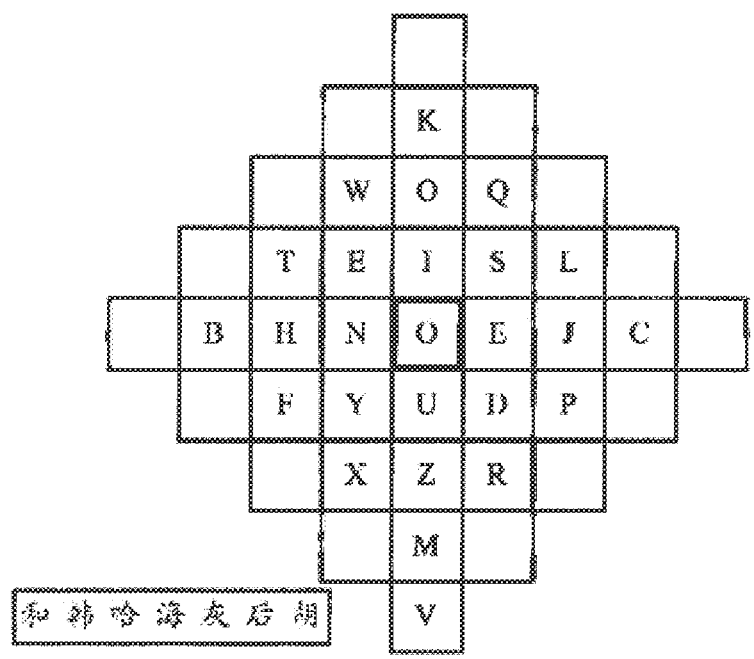

Moreover the first probability statistical table matching the "H" displayed on the selected virtual key is invoked from the set of first probability statistical tables according to "H", and the focus is reset. As illustrated in FIG. 6B, in the virtual on-screen keyboard layout, the letter "E" with the highest combination probability of being combined with "H" is displayed on the virtual key where the focus is set. Then, the user needs to select "A", the focus may be moved by one step through the input control device to thereby reach the virtual key where "A" is displayed, and "A" may be selected through the confirmation key in the input control device. At this time, the second probability statistical table matching the selected character combination "HA" will be invoked, and as illustrated in FIG. 6C, a part of the candidate Chinese characters with the highest association probabilities in the second probability statistical table may be displayed preferentially in the Chinese character display area other than the current virtual on-screen keyboard layout. Moreover the first probability statistical table matching "HA" is invoked from the set of first probability statistical tables according to the selected "A", and as illustrated in FIG. 6D, in the virtual on-screen keyboard layout, the letter "O" with the highest combination probability with "HA" is displayed on the virtual key where the focus is set.

If the candidate Chinese characters displayed in the Chinese character display area include the Chinese character "好 (with the phonetic spelling as HAO)" desired to be input, then the user may have the candidate Chinese characters in the second probability statistical table displayed respectively on the virtual keys in the virtual on-screen keyboard layout through the switch key in the input control device, select the virtual key where the Chinese character "好 (with the phonetic spelling as HAO)" is displayed through the movement keys and the confirmation key, and input the Chinese character "好 (with the phonetic spelling as HAO)" in the input area.

Figure 6E:
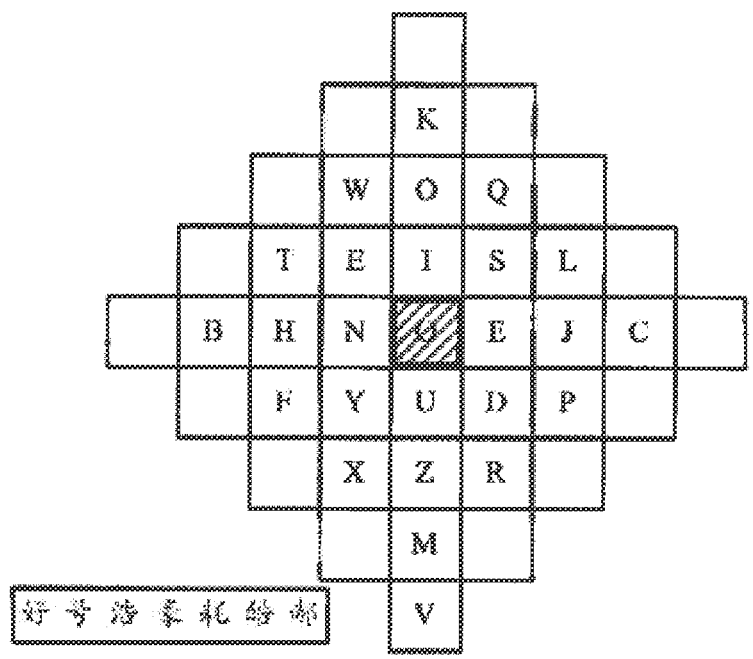
Figure 6F:
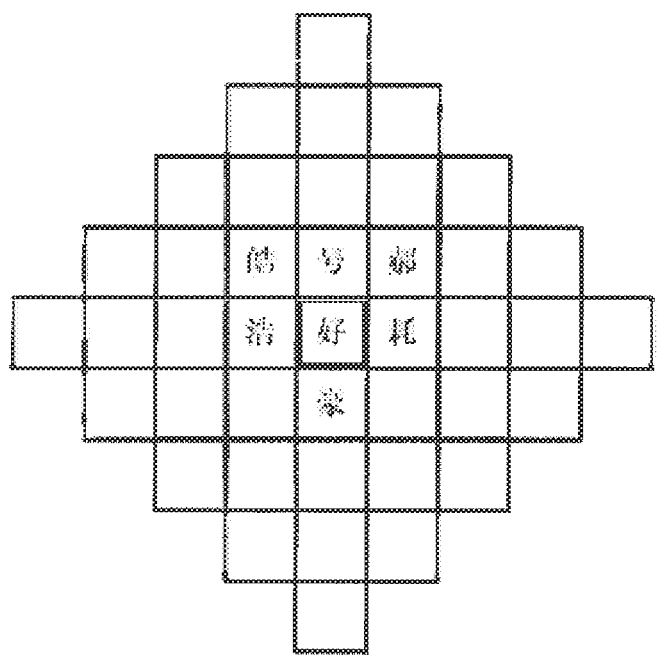

If the candidate Chinese characters displayed in the Chinese character display area do not include the Chinese character "好 (with the phonetic spelling as HAO)" desired to be input, then the user may need to further select a letter. Particularly as illustrated in FIG. 6E, since "O" to be selected at this time is displayed on the virtual key where the focus is set, "O" may be selected directly through the confirmation key in the input control device, and at this time, the second probability statistical table matching the character combination "HAO" may be invoked and a part of candidate Chinese characters in the second probability statistical table displayed in the Chinese character display area. The second probability statistical table may include the Chinese character "好 (with the phonetic spelling as HAO)", and a part of candidate Chinese characters with the highest association probabilities or all of the candidate Chinese characters in the currently invoked second probability statistical table may be displayed preferentially on the virtual keys in the current virtual on-screen keyboard layout through the switch key in the input control device. As illustrated in FIG. 6F, the Chinese character "好 (with the phonetic spelling as HAO)" to be input at this time is displayed exactly on the virtual key where the focus is set, so the Chinese character "好 (with the phonetic spelling as HAO)" may be input to the input area through the input key of the input control device.

It shall be noted that the embodiment of the disclosure will not be limited to the uppercase or the lowercase, although switching between the uppercase and the lowercase may be preset in the input control device so that different first probability statistical tables may be selected for the uppercase and the lowercase.

Figure 7:
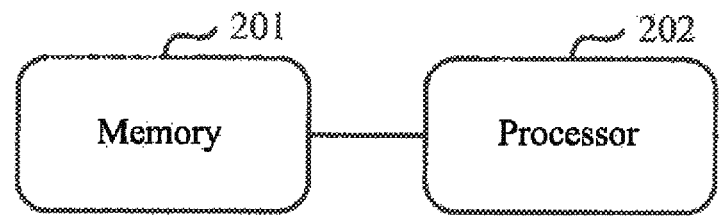
FIG. 7 illustrates a schematic structural diagram of a character inputting device according to some embodiments of the disclosure.

As illustrated in FIG. 7, some embodiments of the disclosure further provide a character inputting device, which may be arranged in an intelligent terminal with a screen, e.g., an intelligent TV set, a PC, a smart phone, etc., possibly, for example, by being integrated inside the intelligent terminal or attached to the intelligent terminal.

The character inputting device may include a memory 201 and one or more processors 202, where the memory 201 stores one or more computer readable program codes, and the one or more processors 202 are configured to execute the one or more computer readable program codes:

when a virtual key in a virtual on-screen keyboard layout is selected by a user, to invoke a first probability statistical table matching at least one character having been displayed by at least one virtual key having been selected, where the first probability statistical table records combination probabilities of candidate characters respectively being combined with the at least one character, and the first probability statistical table is stored in an in-built memory of the character inputting device;

to display a part of the candidate characters with the highest combination probabilities or all of the candidate characters in the invoked first probability statistical table respectively on virtual keys in the virtual on-screen keyboard layout, and to reset focus on a preset virtual key, wherein in the virtual on-screen keyboard layout, the preset virtual key is configured with the highest level, any of other virtual keys spaced a greater number of steps apart from the preset virtual key is configured with a lower level, the number of steps is the least number of virtual keys along a path from the preset virtual key to the any of other virtual keys, and any of the candidate characters displayed on one of the virtual keys configured with a higher level has higher combination probability; and when an ideogram or a character sequence to be input is selected by the user, to input the ideogram or the character sequence selected by the user in an input area.

In some embodiments of the disclosure, the one or more processors 202 in the character inputting device are further configured to execute the one or more processor readable program codes to initialize the virtual on-screen keyboard layout and to display characters based on a default first probability statistical table before the virtual key in the virtual on-screen keyboard layout is selected by the user.

In some embodiments of the disclosure, the one or more processors 202 in the character inputting device are further configured to execute the one or more processor readable program codes:

before the first probability statistical table matching the at least one character having been displayed by at least one virtual key having been selected is invoked, to further invoke a second probability statistical table matching the at least one character, where the second probability statistical table records association probabilities of candidate ideograms or candidate character sequences respectively being associated with the at least one character; and to display a part of the candidate ideograms or candidate character sequences with the highest association probabilities or all of the candidate ideograms or candidate character sequences in the second probability statistical table in other area than the current virtual on-screen keyboard layout.

In some embodiments of the disclosure, the one or more processors 202 in the character inputting device are further configured to execute the one or more processor readable program codes:

after selection of virtual keys, to display a part of the candidate ideograms or candidate character sequences with the highest association probabilities or all of the candidate ideograms or candidate character sequences in the invoked second probability statistical table respectively on the virtual keys in the current virtual on-screen keyboard layout; and when one of the virtual keys in the virtual on-screen keyboard layout is selected by the user, to input the candidate ideogram or the character sequence displayed on the virtual key selected by the user in the input area.

In some embodiments of the disclosure, the one or more processors 202 in the character inputting device are further configured to execute the one or more processor readable program codes:

Before the user selects the virtual key, to detect an area attribute of the input area and to determine a keyword for the area attribute; to pick out, from the set of first probability statistical tables stored in a preset storage area, at least one matching first probability statistical table according to the keyword for the area attribute; and to invoke , from the picked-out at least one first probability statistical table, the first probability statistical table matching at least one character having been displayed by at least one virtual key having been selected by the user.

Figure 8:
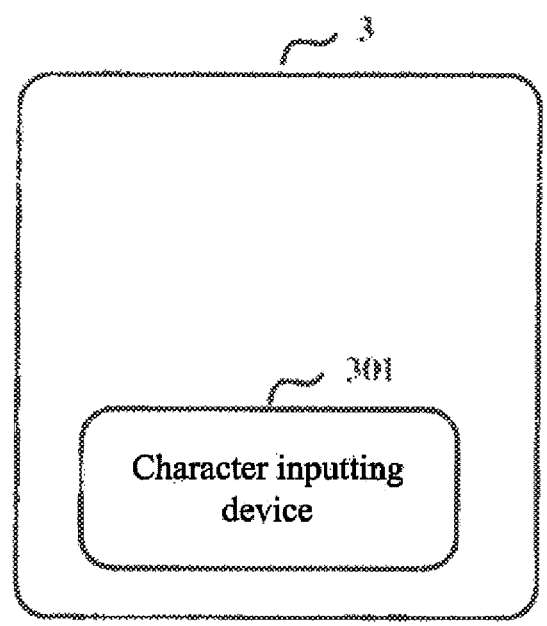
FIG. 8 illustrates a schematic structural diagram of an intelligent terminal according to some embodiments of the disclosure.

Moreover some embodiments of the disclosure further provide an intelligent terminal 3 as illustrated in FIG. 8 in which the character inputting device 31 according to some embodiments above of the disclosure is arranged.

Figure 9:
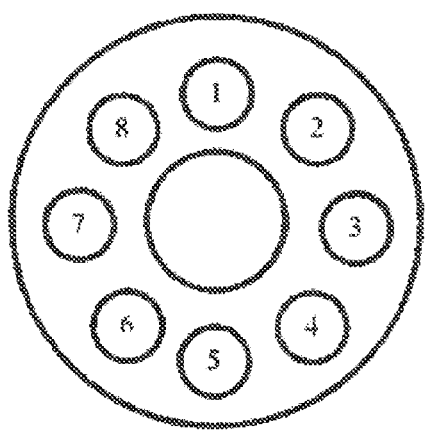
FIG. 9 illustrates a simplified structural diagram of an input control device according to some embodiments of the disclosure.

It shall be noted here the character inputting device 31 according to some embodiments of the disclosure may further include an input control device which may be a remote controller, where the remote controller may be an existing input control device including four direction keys of Up, Down, Left and Down or may be an input control device including circular navigation keys as illustrated in FIG. 9, where keys representing eight different directions (Up, Down, Left, Right, Up-Left, Down-Left, Up-Right and Down-Right) are arranged on a circular control disk, and there may be more directions, in which the focus is moved, due to the additional direction keys to hereby avoid a troublesome selection of a character or a character sequence or an ideogram in a number of movement operations so as to improve the efficiency of inputting of an inputting device to some extent.

Moreover the input control device may be configured with a keyboard layout arranged the same as the virtual on-screen keyboard layout in FIG. 2B. The remote controller includes a circular disk with a larger radius and an annular rotating disk with a smaller radius, and the desired virtual key in the virtual on-screen keyboard layout may be selected by clicking on the corresponding key in the keyboard layout of the input control device for the same effect as that in FIG. 9, so a repeated description thereof will be omitted here.

Figure 10:
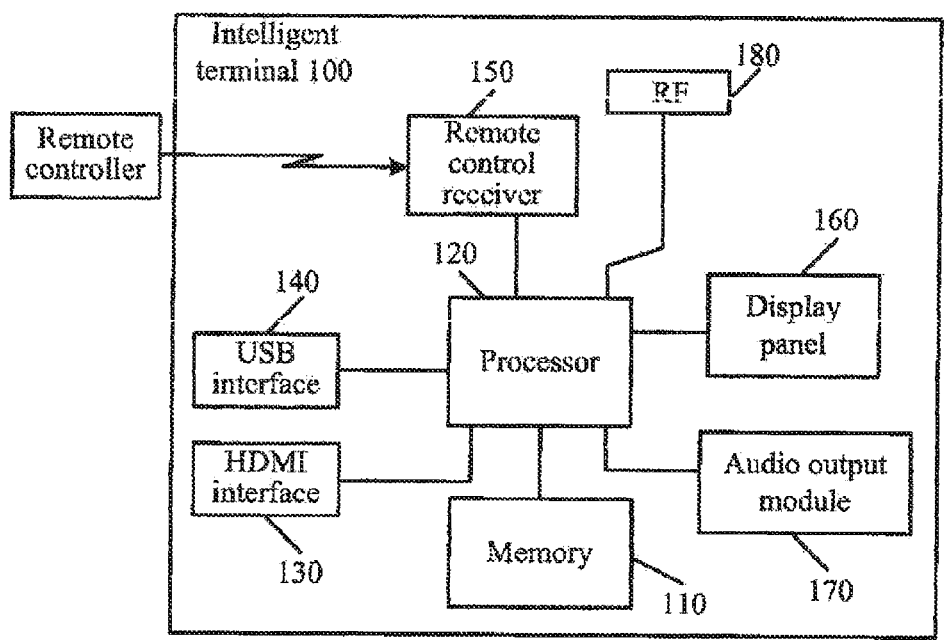
FIG. 10 illustrates a specific structural diagram of an intelligent terminal according to some embodiments of the disclosure.

As illustrated in FIG. 10, some embodiment of the disclosure further provides an intelligent terminal 100.

The intelligent terminal 100 may include a memory 110, one or more input units, one or more output unit, one or more processors 120, etc. Those skilled in the art may appreciate that the intelligent terminal will not be limited to the structure of the intelligent terminal illustrated in FIG. 10 but can include more or less components than those as illustrated, or combine some of the components or arrange different components, where:

The memory 110 may be configured to store software programs and modules, and the one or more processors 120 may be configured to run the software programs and modules stored in the memory 110 to thereby perform various function applications and data processing. Moreover the memory 110 may include a high-speed random access memory and may further include a nonvolatile memory, e.g., at least one magnetic disk memory device, a flash memory device or another volatile solid-state memory device. In addition, the memory 110 may further include a memory controller configured to provide an access of the one or more processors 120 and the input unit to the memory 110.

The one or more processors 120 as a control center of the intelligent terminal 100, has the respective components of the entire intelligent terminal connected by various interfaces and lines, and runs or executes the software programs and/or modules stored in the memory 110 and invokes the data stored in the memory 110 to perform the various functions of the intelligent terminal 100 and process the data to thereby manage and control the intelligent terminal as a whole. Optionally, the processor 120 may include one or more processing cores; and optionally the processor 120 may be integrated with a application processor and a modem processor, where the application processor generally handles the operating system, the user interfaces, the applications, etc., and the modem processor generally handles wireless communication. As can be appreciated, the modem processor may not be integrated into the processor 120.

The intelligent terminal 100 may include input units such as a television broadcast receiver, a HDMI (High-Definition Multimedia Interface) interface 130, a USB interface 140 and an audio/video input interface. The input units may further include a remote control receiver 150 for reception of signal sent by remote controller. Further, input unit may further include a touch sensitive surface and other input device. The touch sensitive surface may be implemented by various types of resistive, capacitive, infrared, surface sound wave and other types. The other input device may include but will not be limited to one or more selected from a group consisted of a physical keyboard, functional keys (e.g., volume control press keys, a power press key, etc.), a track ball, a mouse, a joystick, etc.

The output units may be configured to output audio signal, video signal, alarm signal, vibration signal, etc. The output units may include display panel 160, audio output module 170, etc. The display panel 160 may be configured to display the information input by the user or the information provided to the user, and various graphic user interfaces of the intelligent terminal 100, where these graphic user interfaces may be composed of graphics, texts, icons, videos or any combination thereof. For example, the display panel 160 may be configured in the form of a Liquid Crystal Display (LCD), an Organic Light-Emitting Diode (OLED) display, Flexible Display, three-dimensional (3D) display, CRT, Plasma Display Panel, etc.

The intelligent terminal 100 may further include at least one sensor, e.g., an optical sensor, motion sensor, and other sensors. Particularly, the optical sensor may include an ambient optical sensor and a proximity sensor, where the ambient optical sensor may adjust the brightness of the display panel 160 according to the illumination of ambient light rays, and proximity sensor may disable the display panel 160 and/or a backlight when the intelligent terminal 100 moves to a certain position. The intelligent terminal 100 may be further configured with a gyroscope, a barometer, a hygrometer, a thermometer, an infrared sensor and other sensors.

The intelligent terminal 100 may further include an audio circuit (not illustrated) with a speaker and a microphone. The speaker and the microphone may provide audio interfaces between the user and the intelligent terminal 100. The audio circuit may receive and convert audio data into an electric signal and transmit the electric signal to the speaker, and the speaker may convert the electric signal into an audio signal for output; and on the other hand, the microphone may convert a collected audio signal into an electric signal which is received by the audio circuit and then converted into audio data, and the audio data may be further output to the one or more processors 120 for processing and then transmitted to another terminal, or the audio data may be output to the memory 110 for further processing. The audio circuit may further include an earphone jack for communication between an external earphone and the intelligent terminal 100.

The intelligent terminal 100 may further include RE (Radio Frequency) circuit 180. The RF circuit 180 may be configured to receive and transmit certain signal. Typically, the RF circuit 180 may include but will not be limited to an antenna, at least one amplifier, a tuner, one or more oscillators, a Subscriber Identity Module (SIM) card, a transceiver, a coupler, a Low Noise Amplifier (LAN), a duplexer, etc.

The intelligent terminal 100 may further include WiFi (Wireless fidelity) module (not illustrated). WiFi is a technology of short-range wireless transmission, and the intelligent terminal 100 may assist the user in transmitting and receiving an email, browsing a web page, accessing streaming media, etc., and also provide the user with a wireless broadband access to the Internet, through the WiFi module. It can be appreciated that the WiFi module is not necessarily required for the intelligent terminal 100 and may be omitted as desired without departing from the scope of the disclosure.

Particularly, the memory 110 and the one or more processors 120 may be further configured as described in the above description with respect to the embodiments illustrated in FIG. 7, and for details, reference can be made to FIG. 7 and the relevant description thereof.

According to those embodiments of the disclosure described above, there is provided a character inputting device with a virtual on-screen keyboard layout, where the virtual on-screen keyboard layout may include a plurality of virtual keys of the same and/or different sizes, and in the virtual on-screen keyboard layout, a highest level may be configured for a preset one of the virtual keys, and any of other virtual keys spaced a greater number of steps apart from the preset virtual key may be configured with a lower level; and when a virtual key in the virtual on-screen keyboard layout is selected by a user, a first probability statistical table matching at least one character having been displayed by at least one virtual key having been selected is invoked, a part of candidate characters with the highest combination probabilities or all of the candidate characters in the invoked first probability statistical table may be respectively displayed on virtual keys in the virtual on-screen keyboard layout by making any of the candidate characters displayed on one of the virtual keys configured with a higher level have higher combination probability, and the focus may be reset on the preset virtual key, so that any candidate character displayed on one of the virtual keys closer to the preset virtual key has a higher combination probability where the focus is set, to thereby avoid moving operations troublesome to the user and facilitate the selection of the virtual keys for the characters desired by the user. Moreover after the at least one virtual key is selected by the user, candidate ideograms or character sequences may be displayed on the virtual keys in the current virtual on-screen keyboard layout by also making any of candidate ideograms or candidate character sequences displayed on one of the virtual keys configured with a higher level have higher association probability so that any ideogram or character sequence displayed on one of the virtual keys closer to the focus has a higher association probability, and in this way, the ideogram or character sequence desired by the user can be reached along a path with a less number of steps to thereby improve the efficiency of inputting the ideogram or character sequence, and also an experience of the user, to some extent.

Those skilled in the art shall appreciate that the embodiments of the disclosure may be embodied as a method, a system or a computer program product. Therefore the disclosure may be embodied in the form of an all-hardware embodiment, an all-software embodiment or an embodiment of software and hardware in combination. Furthermore the disclosure may be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram may be embodied in computer program instructions. These computer program instructions may be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions may also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions may also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the disclosure have been described, those skilled in the art benefiting from the underlying inventive concept may make additional modifications and variations to these embodiments. Therefore the appended claims are intended to be construed as encompassing the preferred embodiments and all the modifications and variations coming into the scope of the disclosure.

Evidently those skilled in the art may make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A character inputting method, comprising:
   receiving, by an intelligent television, an instruction to select a virtual key in a virtual on-screen keyboard layout displaying a plurality of virtual keys from a user via a remote controller, wherein each virtual key has a character corresponding thereto and the virtual on-screen keyboard layout corresponding to the remote controller is displayed on a screen of the intelligent television;
   determining, by the intelligent television, candidate characters being combined with the character corresponding to the virtual key selected, wherein combination probabilities of candidate characters respectively being combined with the character corresponding to the virtual key selected are recorded in a first probability statistical table;
   rearranging at least of a portion of the characters displayed on the plurality of virtual keys such that one of the determined candidate characters is displayed on a preset virtual key in the virtual on-screen keyboard layout, and other candidate characters are displayed on other virtual keys arranged around the preset virtual key, wherein:
     a combination probability of the one of determined candidate character on the preset virtual key being combined with the character corresponding to the virtual key selected is greater than each combination probability of the other candidate characters on the other virtual keys being combined with the character corresponding to the virtual key selected; and
     the number of steps of said other virtual keys apart from the preset virtual key has a reverse correlation with combination probability of the other candidate characters, wherein the number of steps is the least number of virtual keys along a path from the preset virtual key to any of other virtual keys; and
   performing, by the intelligent television, said receiving operation, said determining operation, and said rearranging operation periodically until an ideogram or a character sequence to be input is selected by the user, and inputting the ideogram or the character sequence selected by the user in an input area.

2. The method according to claim 1, wherein before the virtual key in the virtual on-screen keyboard layout is selected by the user, the method further comprises:
   initializing the virtual on-screen keyboard layout and displaying characters based on a default first probability statistical table.

3. The method according to claim 1, wherein before the intelligent television determines candidate characters being combined with a character corresponding to the virtual key selected, the method further comprises:
   invoking a second probability statistical table matching the character corresponding to the virtual key selected, wherein the second probability statistical table records association probabilities of candidate ideograms or candidate character sequences respectively being associated with the character corresponding to the virtual key selected; and
   displaying a part of the candidate ideograms or candidate character sequences with highest association probabilities or all of the candidate ideograms or candidate character sequences in the second probability statistical table in other area than the virtual on-screen keyboard layout.

4. The method according to claim 3, wherein the method further comprises:
   displaying a part of the candidate ideograms or candidate character sequences with the highest association probabilities or all of the candidate ideograms or candidate character sequences in the invoked second probability statistical table respectively to replace the candidate characters displayed on the virtual keys in the virtual on-screen keyboard layout; and
   when one of the virtual keys in the virtual on-screen keyboard layout is selected by the user, inputting a candidate ideogram or a candidate character sequence displayed on the virtual key selected by the user in the input area.

5. The method according to claim 1, wherein before the virtual key in the virtual on-screen keyboard layout is selected by the user, the method further comprises:
   detecting an area attribute of the input area and determining a keyword for the area attribute;

picking out, from a set of first probability statistical tables stored in a preset storage area, at least one first probability statistical table matching the keyword for the area attribute; and invoking, from the at least one first probability statistical table, the first probability statistical table matching the character corresponding to the virtual key selected.

6. A character inputting device, which applies to an intelligent television, the device comprising a memory and one or more processors, wherein the memory stores one or more computer readable program codes, and the one or more processors are configured to execute the one or more computer readable program codes to:

receive an instruction to select a virtual key in a virtual on-screen keyboard layout displaying a plurality of virtual keys from a user via a remote controller, wherein each virtual key has a character corresponding thereto and the virtual on-screen keyboard layout corresponding to the remote controller is displayed on a screen of the intelligent television;

determine candidate characters being combined with the character corresponding to the virtual key selected, wherein combination probabilities of candidate characters respectively being combined with the character corresponding to the virtual key selected are recorded in a first probability statistical table;

rearrange at least of a portion of the characters displayed on the plurality of virtual keys such that one of the determined candidate characters displayed on a preset virtual key in the virtual on-screen keyboard layout, and other candidate characters are displayed on other virtual keys arranged around the preset virtual key, wherein:

a combination probability of the one of the determined candidate characters on the preset virtual key being combined with the character corresponding to the virtual key selected is greater than each combination probability of the other candidate characters on the other virtual keys being combined with the character corresponding to the virtual key selected; and the number of steps of said other virtual keys apart from the preset virtual key has a reverse correlation with combination probability of the other candidate characters, wherein the number of steps is the least number of virtual keys along a path from the preset virtual key to any of other virtual keys; and perform said receive operation, said determined operation, and said rearranged operation periodically until an ideogram or a character sequence to be input is selected by the user, and after the ideogram or the character sequence to be input is selected by the user, input the ideogram or the character sequence selected by the user in an input area.

7. The device according to claim 6, wherein the one or more processors are further configured to execute the one or more computer readable program codes to:

initialize the virtual on-screen keyboard layout and display characters based on a default first probability statistical table before the virtual key in the virtual on-screen keyboard layout is selected by the user.

8. The device according to claim 6, wherein the one or more processors are further configured to execute the one or more computer readable program codes to:

before determining candidate characters being combined with the character corresponding to the virtual key selected, invoke a second probability statistical table matching the character corresponding to the virtual key selected, wherein the second probability statistical table records association probabilities of candidate ideograms or candidate character sequences respectively being associated with the character corresponding to the virtual key selected; and display a part of the candidate ideograms or candidate character sequences with highest association probabilities or all of the candidate ideograms or candidate character sequences in the second probability statistical table in other area than the virtual on-screen keyboard layout.

9. The device according to claim 8, wherein the one or more processors are further configured to execute the one or more computer readable program codes to:

display a part of the candidate ideograms or candidate character sequences with highest association probabilities or all of the candidate ideograms or candidate character sequences in the invoked second probability statistical table respectively to replace the candidate characters displayed on the virtual keys in the virtual on-screen keyboard layout; and when one of the virtual keys in the virtual on-screen keyboard layout is selected by the user, input a candidate ideogram or a candidate character sequence displayed on the virtual key selected by the user in the input area.

10. The device according to claim 6, wherein the one or more processors are further configured to execute the one or more computer readable program codes to:

before the virtual key in the virtual on-screen keyboard layout is selected by the user, detect an area attribute of the input area and to determine a keyword for the area attribute;

pick out, from a set of first probability statistical tables stored in a preset storage area, at least one first probability statistical table matching the keyword for the area attribute; and invoke, from the at least one first probability statistical table, the first probability statistical table matching the character corresponding to the virtual key selected.

11. An intelligent television, comprising a character inputting device comprising a memory and one or more processors, wherein the memory stores one or more computer readable program codes, and the one or more processors are configured to execute the one or more computer readable program codes to:

receive an instruction to select a virtual key in a virtual on-screed keyboard layout displaying a plurality of virtual keys from a user via a remote controller, wherein each virtual key has a character corresponding thereto and the virtual on-screen keyboard layout corresponding to the remote controller is displayed on a screen of the intelligent television;

determine candidate characters being combined with the character corresponding to the virtual key selected, wherein combination probabilities of candidate characters respectively being combined with the character corresponding to the virtual key selected are recorded in a first probability statistical table;

rearrange at least of a portion of the characters displayed on the plurality of virtual keys such that one of the determined candidate characters is displayed on a preset virtual key in the virtual on-screen keyboard layout, and other candidate characters are displayed on other virtual keys arranged around the preset virtual key; and perform said receive operation, said determine operation, and said rearrange operation periodically until an ideogram or a character sequence to be input is selected by the user, and after the ideogram or the character sequence to be input is selected by the user, input the ideogram or the character sequence selected by the user in an input area;
wherein:
  a combination probability of the one of the determined candidate characters on the preset virtual key being combined with the character corresponding to the virtual key selected is greater than each combination probability of the other candidate on the other virtual keys being combined with the character corresponding to the virtual key selected; and
  the number of steps of said other virtual keys apart from the preset virtual key has a reverse correlation with combination probability of the other candidate characters, wherein the number of steps is the least number of virtual keys along a path from the preset virtual key to any of other virtual keys.

12. The intelligent television according to claim 11, wherein the one or more processors are further configured to execute the one or more computer readable program codes to:
  initialize the virtual on-screen keyboard layout and display characters based on a default first probability statistical table before the virtual key in the virtual on-screen keyboard layout is selected by the user.

13. The intelligent television according to claim 11, wherein the one or more processors are further configured to execute the one or more computer readable program codes to:
  before determining candidate characters being combined with a character corresponding to the virtual key selected, invoke a second probability statistical table matching the character corresponding to the virtual key selected, wherein the second probability statistical table records association probabilities of candidate ideograms or candidate character sequences respectively being associated with the character corresponding to the virtual key selected; and
  display a part of the candidate ideograms or candidate character sequences with highest association probabilities or all of the candidate ideograms or candidate character sequences in the second probability statistical table in other area than the virtual on-screen keyboard layout.

14. The intelligent television according to claim 13, wherein the one or more processors are further configured to execute the one or more computer readable program codes to:
  display a part of the candidate ideograms or candidate character sequences with the highest association probabilities or all of the candidate ideograms or candidate character sequences in the invoked second probability statistical table respectively to replace the candidate characters displayed on the virtual keys in the virtual on-screen keyboard layout; and
  when one of the virtual keys in the virtual on-screen keyboard layout is selected by the user, input a candidate ideogram or a candidate character sequence displayed on the virtual key selected by the user in the input area.

15. The intelligent television according to claim 11, wherein the one or more processors are further configured to execute the one or more computer readable program codes to:
  before the virtual key in the virtual on-screen keyboard layout is selected by the user, detect an area attribute of the input area and to determine a keyword for the area attribute;
  pick out, from a set of first probability statistical tables stored in a preset storage area, at least one first probability statistical table matching the keyword for the area attribute; and
  invoke, from the at least one first probability statistical table, the first probability statistical table matching the character corresponding to the virtual key selected.

* * * * *